US012694050B1

(12) United States Patent
Carrett et al.

(10) Patent No.: US 12,694,050 B1
(45) Date of Patent: ***Jul. 28, 2026

(54) APPARATUS AND METHOD FOR CLUSTERING RELATED TUPLES DERIVED FROM CONTENT IN AN UNSTRUCTURED DATABASE

(71) Applicant: Break the Web Technology Co., San Francisco, CA (US)

(72) Inventors: Cameron Carrett, Kellyville (AU); Jacob Guernsey, San Francisco, CA (US)

(73) Assignee: Break the Web Technology Co., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,243

(22) Filed: Dec. 22, 2023

Related U.S. Application Data

(60) Provisional application No. 63/477,157, filed on Dec. 23, 2022.

(51) Int. Cl.
*G06F 16/00* (2019.01)
*G06F 16/3332* (2025.01)
*G06F 16/355* (2025.01)
*G06F 16/383* (2019.01)

(52) U.S. Cl.
CPC ........ *G06F 16/355* (2019.01); *G06F 16/3334* (2019.01); *G06F 16/3335* (2019.01); *G06F 16/383* (2019.01)

(58) Field of Classification Search
CPC .............. G06F 16/355; G06F 16/3334; G06F 16/3335; G06F 16/383

USPC .......................................................... 707/737
See application file for complete search history.

(56) References Cited

U.S. PATENT DOCUMENTS

| | | | |
|---|---|---|---|
| 8,719,302 B2 | 5/2014 | Bailey et al. | |
| 9,015,153 B1 | 4/2015 | Zhang | |
| 10,515,125 B1 * | 12/2019 | Lavergne | G06F 16/93 |
| 10,911,386 B1 | 2/2021 | Beckman et al. | |
| 11,782,941 B2 * | 10/2023 | Mahdy | G06F 16/26 707/722 |
| 2012/0166180 A1 * | 6/2012 | Au | G06F 40/237 704/9 |

(Continued)

OTHER PUBLICATIONS

Non-Final Office Action for U.S. Appl. No. 18/395,257 mailed Aug. 30, 2024, 9 pages.

(Continued)

*Primary Examiner* — Monica M Pyo
(74) *Attorney, Agent, or Firm* — Cooley LLP

(57) ABSTRACT

A computer implemented method includes receiving a baseline dataset divisible by temporal or logical criteria. A target dataset representing a small fraction of the baseline dataset is received. The target dataset is segmented by the temporal or logical criteria. Numbers of documents containing individual terms within the baseline dataset are identified to form baseline singles. Numbers of documents containing common combinations of individual terms within the target dataset are identified to form target tuples. Combinations of the target tuples are coalesced based upon baseline singles criteria to form a first coalesced dataset representing significant content in the target dataset.

8 Claims, 9 Drawing Sheets

(56)             References Cited

U.S. PATENT DOCUMENTS

| | | | | |
|---|---|---|---|---|
| 2015/0220539 A1* | 8/2015 | Lambert | ............... | G06F 16/355 |
| | | | | 707/723 |
| 2016/0188609 A1* | 6/2016 | Strassner | ................ | G06F 16/81 |
| | | | | 707/740 |
| 2017/0213127 A1* | 7/2017 | Duncan | .................. | G16B 50/30 |
| 2019/0108226 A1 | 4/2019 | Boxwell et al. | | |
| 2019/0228010 A1* | 7/2019 | Ikarashi | ................. | H04L 9/085 |
| 2020/0218761 A1 | 7/2020 | Roberts et al. | | |
| 2021/0157858 A1* | 5/2021 | Stevens | ................ | G06F 40/237 |
| 2021/0256036 A1 | 8/2021 | Luo et al. | | |
| 2022/0147713 A1 | 5/2022 | Garimella et al. | | |
| 2023/0022673 A1 | 1/2023 | Derzsy et al. | | |
| 2023/0103076 A1* | 3/2023 | Zhou | ........................ | G06N 5/04 |
| | | | | 726/1 |
| 2023/0136726 A1* | 5/2023 | Chew | ................... | G06V 30/416 |
| | | | | 704/9 |
| 2023/0325418 A1* | 10/2023 | Dharaskar | ............... | G06F 16/25 |
| 2024/0045896 A1 | 2/2024 | Saha et al. | | |

OTHER PUBLICATIONS

Final Office Action for U.S. Appl. No. 18/395,257 mailed Mar. 11, 2025, 11 pages.
U.S. Appl. No. 18/395,257, Notice of Allowance mailed Aug. 12, 2025; Inventor Carrett, Cameron et al.; 10 pages.

\* cited by examiner

200

Receive Baseline Dataset — 201

Receive Target Dataset — 202

Form Baseline Singles — 204

Form Target Tuples — 206

Form a Coalesced Dataset — 208

Automatically Aggregated Stories via Coalesced Tuples

Disaggregated Documents from Source Dataset

| Continuity ID | Snapshot Thread IDs | | | | | |
|---|---|---|---|---|---|---|
| A | 5002 | 5003 | 5004 | 5005 | 5006 | 5007 |
| B | 6203 | 6204 | 6205 | 6206 | 6207 | 6208 |
| C | 7305 | 7306 | 7307 | 7308 | 7309 | 7310 |
| D | 8412 | 8413 | 8414 | 8415 | 8416 | 8417 |

| Story ID | Snapshot Thread IDs | | | | | |
|---|---|---|---|---|---|---|
| 1000 | 5000 | 5001 | 5002 | 5003 | 5004 | 5005 |
| 1001 | 6200 | 6201 | 6202 | 6203 | 6204 | 6205 |
| 1002 | 7302 | 7303 | 7304 | 7305 | 7306 | 7307 |
| 1003 | 8408 | 8409 | 8410 | 8411 | 8412 | 8413 |

FIG. 9

APPARATUS AND METHOD FOR CLUSTERING RELATED TUPLES DERIVED FROM CONTENT IN AN UNSTRUCTURED DATABASE

CROSS-REFERENCE TO RELATED APPLICATION

This application claims priority to U.S. Provisional Patent Application No. 63/477,157, filed Dec. 23, 2022, the contents of which are incorporated herein by reference. This application is related to commonly owned U.S. patent application Ser. No. 18/395,257, filed Dec. 22, 2023.

FIELD OF THE INVENTION

This invention relates generally to finding significant content in large corpuses of data. More particularly, this invention is directed to finding significant content in large corpuses of data by analyzing individual terms in the data to develop meaningful thematic conceptual clusters of the data sources.

BACKGROUND OF THE INVENTION

Relational databases have a well-known relational structure that is conducive to Structured Query Language (SQL) queries. In contrast, an unstructured database, also known as a document-oriented database or a No-SQL database is a comparatively unruly collection of materials that defy efficient query processing.

Accordingly, there is a need for improved processing within unstructured databases.

SUMMARY OF THE INVENTION

A computer implemented method includes receiving a baseline dataset divisible by temporal or logical criteria. A target dataset representing a small fraction of the baseline dataset is received. The target dataset is segmented by the temporal or logical criteria. Numbers of documents containing individual terms within the baseline dataset are identified to form baseline singles. Numbers of documents containing common combinations of individual terms within the target dataset are identified to form target tuples. Combinations of the target tuples are coalesced based upon baseline singles criteria to form a first coalesced dataset representing significant content in the target dataset.

BRIEF DESCRIPTION OF THE FIGURES

The invention is more fully appreciated in connection with the following detailed description taken in conjunction with the accompanying drawings, in which:

FIG. 9 illustrates story ID updates in accordance with an embodiment of the invention.

Like reference numerals refer to corresponding parts throughout the several views of the drawings.

DETAILED DESCRIPTION OF THE INVENTION

Figure 1:
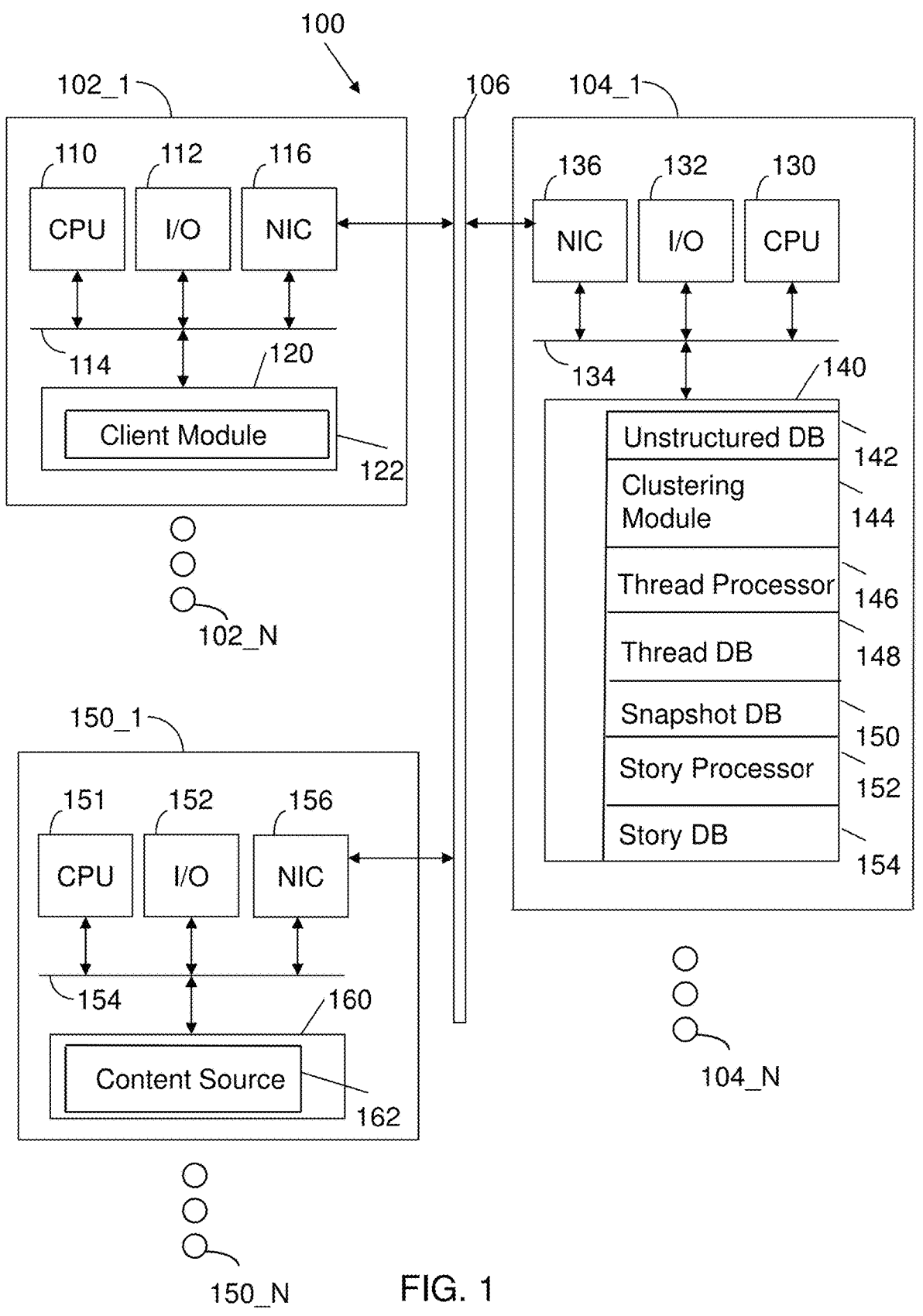
FIG. 1 illustrates a system configured in accordance with an embodiment of the invention.

FIG. 1 illustrates a system 100 configured in accordance with an embodiment of the invention. The system 100 includes client machines 102_1 through 102_N connected to server machines 104_1 through 104_N via a network 106, which may be any combination of wired and wireless networks. Content source machines 150_1 through 150_N are also connected to network 106.

The server machines 104_1 through 104_N implement operations disclosed herein. By way of overview, the server machines 104_1 through 104_N collect content from content source machines 150_1 through 150_N to form an unstructured database 142 of content. A clustering module 144 subsequently organizes the content, as discussed in detail below. Thereafter, the client machines 102_1 through 102_N can query the unstructured database 142 and perform other operations on the organized content. The memory 140 also stores a thread processor 146 that is used to construct a thread database 148 and snapshot database 150, as detailed below. The memory 140 also has a story processor 152 used to construct a story database 154, as detailed below.

Each client machine 102_1 through 102_N includes a processor 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores instructions executed by processor 110. In particular, the memory stores a client module 122 that includes instructions to use network 106 to communicate with servers 104_1 through 104_N.

Each server (e.g., server 104_1) includes a processor, 130, input/output devices 132, a bus 134 and a network interface circuit 136 to provide connectivity to network 106. A memory 140 is also connected to the bus 134. The memory stores instructions executed by processor 130 to implement operations disclosed herein. The memory stores an unstructured database 142 and a clustering module 144 to organize information in the unstructured database 142. The organized information is processed by a thread processor 146, which creates a thread database 148 and a snapshot database 150 based upon the processing, as detailed below.

Each content server (e.g., 150_1) includes a processor 151, input/output devices 152, a bus 154 and a network interface circuit 156 to provide connectivity to network 106. A memory 160 is also connected to the bus 154. The memory 160 stores a content source module 162 with instructions executed by processor 151 to deliver content to one or more servers 104_1 through 104_N.

Figure 2:
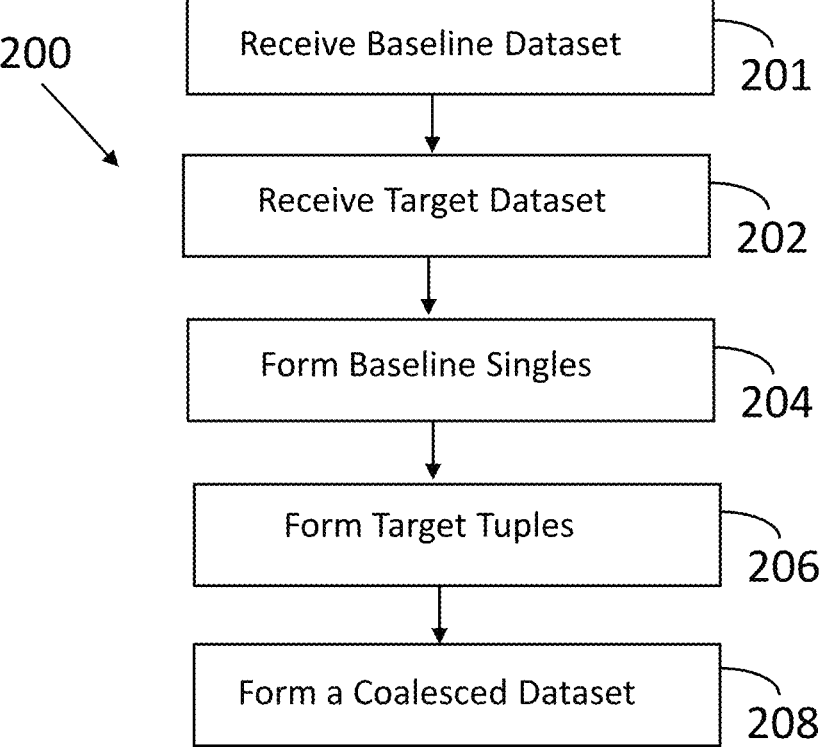
FIG. 2 illustrates processing operations performed in accordance with an embodiment of the invention.

FIG. 2 illustrates processing operations 200 performed by clustering module 144. A baseline dataset is received 201. More particularly, a baseline dataset divisible by a temporal criterion (e.g., a 24-hour period) or a logical criterion (e.g., chapters in a textbook) is received.

A target dataset is then received 202. The target dataset represents a small fraction of the baseline dataset. The target dataset is segmented by the same temporal criterion or logical criterion as the baseline dataset. Subsequent operations analyze the target dataset against the baseline dataset to identify significant content in the target dataset.

Baseline singles are then formed 206. That is, numbers of documents containing individual terms within the baseline dataset are identified to form baseline singles (e.g., single terms and an associated number of documents).

Target tuples are then formed 206. That is, numbers of documents containing individual terms within the target dataset are identified to form target tuples (e.g., collections of two or more terms, where each collection is a tuple).

A coalesced dataset is then formed 208. Combinations of target tuples are coalesced based upon baseline singles criteria to form a coalesced dataset, as demonstrated below.

In one embodiment, a supplementary dataset of baseline values is then formed. The supplementary dataset baseline values include terms commonly deemed significant.

In this embodiment, a second coalesced dataset is formed. That is, the original coalesced data set and the supplementary dataset baseline values are used to form a second coalesced dataset representing significant content in the target dataset.

The foregoing operations are more fully appreciated in connection with the following detailed example. The example is for illustrative purposes. Many variations on the example are still within the scope of the invention. For example, the following example focuses on a baseline dataset of news articles divided into temporal periods of twenty-four hours. The example also focuses on an embodiment that uses tuples with four values ("quads"), but other tuple configurations may be used in accordance with embodiments of the invention.

The source dataset is defined as the general input data on which the clustering module 144 runs. The clustering module 144 is also referred to herein as CT-X. For example, the source dataset may be news articles spanning the past 365 days. A key attribute of the source dataset is that it contains properties that allow the dataset to be divided into two sub-datasets (target and baseline). For example, a source dataset that will be divided by its temporal property requires that a publishing date be present for every document in the source dataset.

Lookup tables from external data sources can also be brought in to provide evidence of terms of importance ("important terms") within the source dataset. This step is optional but extremely beneficial for the quality of results. Depending on the dataset being studied, the type of lookup table may vary. Examples of lookup tables relevant to a source dataset of news articles might include:

A list of known people/celebrities
A list of countries, states, regions, and city names
A list of company/organization names
A list of special events (Christmas, etc.)
A list of movies, TV shows, books, plays etc.
Wikipedia article entries For best results, source data should be cleaned and pre-processed by removing punctuation, performing stemming/lemmatization, identifying important terms via lookup tables, and connecting terms that belong together (e.g., first name, last name) with an underscore to make them compound terms. This step is optional but extremely beneficial for the quality of results. By standardizing the format of each term, indexing and term matching performance throughout the system is dramatically increased.

Consider the following news article:

IDF Spokesperson to Newsmax: Hamas Requested Certain Prisoners for Swaps Maj. Doron Spielman, the international spokesperson for the Israel Defense Forces, told Newsmax on Wednesday that Hamas requested certain individuals be released as part of the hostage-prisoner swaps that have been taking place between Israel and the Palestinian militant after pre-processing the article becomes . . . .

idf spokesperson to newsmax hamas requested certain prisoners for swaps—maj doron spielman the international spokesperson for the israel_defense_forces told newsmax on wednesday that hamas requested certain individuals be released as part of the hostageprisoner swaps that have been taking place between israel and the palestine militant The baseline dataset is defined as the source dataset without the target dataset. For example, days 1-364. For best results, the target and baseline datasets should not overlap.

The target dataset is the range in which to look for thematically related/trending content. For example, day 365, in contrast to the baseline of days 1-364.

A bag of words is used to hold a list of terms or tuples along with their calculated frequency. Consider the following examples.

| Term | Frequency |
| --- | --- |
| apple | 876 |
| peach | 431 |
| pear | 339 |

| Tuple | Frequency |
| --- | --- |
| [apple, pear] | 221 |
| [peach, pear] | 109 |

The following bags are used within an embodiment of the clustering module 144 (CT-X):

Baseline bag of singles
  Single terms
  Average number of documents each term is found in per day within the baseline dataset
Target bag of singles
  Single terms
  Average number of documents each term is found in per day within the target dataset
    If the target date range is a single day, no average calculation is necessary; if the target date range spans more than 1 day, the average across multiple days should be calculated
Target bag of doubles
  Doubles; tuple size of 2 [a, b]
  Average number of documents each tuple/combination of terms are all found in per day within the target dataset.
Target bag of triples
  Triples; tuple size of 3 [a, b, c]
  Average number of documents each tuple/combination of terms are all found in per day within the target dataset.

5

Target bag of quads

Quads; tuple size of 4 [a, b, c, d]

Average number of documents each tuple/combination of terms are all found in per day within the target dataset.

Term frequency is calculated in rounds, with each round taking the terms with frequencies above a certain threshold to limit the computation required. This is referred to herein as skim mining (ranking target tuples by numbers of instances and then filtering and thereby skimming target tuples to a fraction of all target tuples). Skim mining collects significant terms in the target and omits insignificant terms in the target to effectively compress target data into its most significant content. Skim mining is also performed on large datasets to limit the number of tuples to a reasonable level (e.g., no more than 50-100 k). When limiting by the number of tuples, the dataset is first ordered by most frequent tuples to least frequent, then the top 50-100 k tuples are used.

It is also important that tuples with the same frequency are used as the floor. For example:

100
95
50
50
43
43
43
42
42
41

If the floor is calculated using the top 5 records, records (tuples) 1-7 must be used, as position 5 is the same as position 6 and 7. To take the top 5 records, score at position 5=43, therefore floor is >=43 . . . and tuples 1-7 must be used.

Skim mining is performed for 2 reasons:

To vastly reduce the computation required

To increase the Low Value Keyword (LVK) threshold to tuple threshold spread. The greater the tuple threshold, the greater each term within a tuple must be trending.

The minimum frequency should optimally be the quad threshold value (2×LVK threshold). Consider the following abstract dataset and thresholds:

−$LVK$ threshold = 3.5

−Quad/tuple threshold = 7.0 (2x $LVK$ threshold)

Target bag of singles:

−$a$ = 11; $a$ occurs in 11 documents

−$b$ = 40; $b$ occurs in 40 documents

−$c$ = 97; $c$ occurs in 97 documents

−$d$ = 21; $d$ occurs in 21 documents

−$e$ = 3; $e$ occurs in 3 documents

"e" occurs in less than 7 documents; therefore, it can be removed from the next round.

6

Target bag of doubles:

−[$a, b$] = 11; $a, b$ occurs in 11 documents;

$b$ is contained in all documents containing $a$

−[$a, c$] = 8; $a, c$ occurs in 8 documents

−[$a, d$] = 10; $a, d$ occurs in 10 documents

−[$b, c$] = 29; $b, c$ occurs in 29 documents

−[$b, d$] = 21; $b, d$ occurs in 21 documents

−[$c, d$] = 11; $c, d$ occurs in 11 documents

All doubles are above the threshold of 7 and will be evaluated for the next round.

Target bag of triples:

−[$a, b, c$] = 8; $a, b, c$ occurs in 8 documents

−[$a, b, d$] = 10; $a, b, d$ occurs in 10 documents

−[$b, c, d$] = 11; $b, c, d$ occurs in 11 documents

Target bag of quads:

−[$a, b, c, d$] = 8; $a, b, c, d$ occurs in 8 documents

Some key take aways:

The frequency of tuple [a, b, c, d] will always be less than combinations it contains:

[a, b], [a, c], [a, d], [b, c], [b, d], [c, d] will always have a frequency of >=[a, b, c, d]

a, b, c, d will always have a frequency >=their combinations in double, triple, quad form If the target tuple frequency of [a, b, c, d] is 8, it can be assumed that the target frequency for single terms a, b, c, d individually is >=8.

The values for each shown above is calculated for each term detected in the documents (corpus), except for stop terms and other less useful terms (e.g., "the", "a").

CT-X uses the following values:

Document frequency in baseline dataset for each term

Document frequency in target dataset for each term

Document frequency in target dataset for term tuples (combinations of terms)

The baseline frequency calculation forms what is expected for a certain term; the number of documents the term would be expected to appear in. The target frequency calculation is the number of documents the term appears in within the target dataset. Consider the following examples.

| Single/Term | Baseline Score | Target Score | Multiple | Conclusion |
|---|---|---|---|---|
| australia | 5.7 | 12 | 2.11 | Trending |
| bolivia | 1.8 | 10 | 5.56 | Trending |
| france | 7.6 | 22 | 2.89 | Trending |
| germany | 4.2 | 3 | 0.71 | Not trending |
| global_warming | 29.8 | 20 | 0.67 | Not trending |
| iceland | 2.1 | 18 | 8.71 | Trending |
| usa | 8.5 | 30 | 3.53 | Trending |
| world_cup | 1.3 | 15 | 11.54 | Trending |

Single terms are not particularly reliable for querying content, as they lack context around the reason for that term to be trending. CT-X expands the document frequency calculation to tuples. It looks for a combination of terms to be used within multiple documents. Consider the following example.

| Double/Tuple | Target Score | Conclusion |
|---|---|---|
| australia, world_cup | 11 | 11 docs contained australia and world_cup |
| australia, bolivia | 10 | 10 docs contained australia and bolivia |
| australia, france | 12 | 12 docs contained australia and france |
| australia, usa | 9 | 9 docs contained australia and usa |
| iceland, usa | 20 | 20 docs contained iceland and usa |
| global_warming, usa | 14 | 14 docs contained global_warming and usa |

Some assumptions can already be made. Australia and any other term cannot be contained within more than 12 times (as that was the target score). Australia and world_cup were contained within 11 documents of the 12 documents containing Australia, and 11 of the 15 possible world_cup documents. We can assume that the tuple frequency is always lower than each of the tuple's terms maximum possible frequency within the target dataset. In one embodiment of the invention, quads (tuples size=4) are used.

| Quad/Tuple | Target Score | Conclusion |
|---|---|---|
| australia, bolivia, france, world_cup | 10 | 10 docs contained all terms |
| australia, france, usa, world_cup | 12 | 10 docs contained all terms |
| bolivia, france, usa, world_cup | 10 | 10 docs contained all terms |
| iceland, france, usa, global_warming | 12 | 12 docs contained all terms |
| germany, france, global_warming, usa | 1 | 1 doc contained all terms |

Quads contain far more information than a single term, and we now have context surrounding a single term. We now also have potentially hundreds of tuples that contain a single term, so a way to associate the tuples should be used. The association between quads is defined by a common term where the following conditions are met:

Tuple/quad frequency is sufficiently high (e.g., 10+)

Baseline term common between 2 tuples that has baseline frequency sufficiently low.

To identify baseline terms that can be used for association (merging), the LVK threshold is used:

$LVK$ threshold = Average frequency of baseline term +

$(0.75 * $standard deviation of baseline terms$)$

Any tuples that share a term that is also an LVK (baseline frequency below LVK threshold) can be merged to form a "coalesced tuple". Assume that the LVK threshold is 3.5; the table below identifies the LVK terms that can be used for merging. The quad threshold should be at least 2× the LVK threshold (in this case, >7.0).

| Quad/Tuple | LVKs | Tuple Frequency | Notes |
|---|---|---|---|
| australia, bolivia, france, world_cup | bolivia, world_cup | 10 | Tuple freq good, contains merge terms |
| australia, france, usa, world_cup | world_cup | 12 | Tuple freq good, contains merge term |
| bolivia, france, usa, world_cup | bolivia, world_cup | 10 | Tuple freq good, contains merge terms |
| iceland, france, usa, global_warming | iceland | 12 | Tuple freq good, contains merge term |
| germany, france, global_warming, usa | global_warming | 1 | Tuple freq too low, ignored |

The resulting coalesced tuples are:

| | |
|---|---|
| australia, bolivia, france, usa, world_cup | [australia, bolivia, france, world_cup], [australia, france, usa, world_cup], [bolivia, france, usa, world_cup] |
| france, global_warming, iceland, usa | [iceland, france, usa, global_warming] |

Even though the coalesced tuples contain some of the same terms, they describe unique stories and provide context beyond what a single term can provide. When the originating dataset is queried, tuples within each coalesced tuple should be used to ensure the accuracy of matching documents.

CT-X output is an array of coalesced tuples. Scoring and original tuples are kept intact to allow detailed document queries of the source datasets. An example excerpt of CT-X output is below.

510 coalesced tuples formed from 39045 tuples. 60 coalesced tuples after filtering.

−10,651,358 documents in source dataset

−19,485 documents in target dataset (days = 1)

−10,631,873 documents in baseline dataset (days = 364)

−Effective Tuple Threshold = 10.0

−$LVK$ Threshold = 4.46

−Raw Tuple Count = 3,182,390

−Used Tuple Count = 39,045

−Coalesced Tuple Count = 510

−Coalesced Tuple Count after filtering = 60

Coalesced Tuple 1
[abortion[14856], texas[14720], woman[14597], state[14262], leaves[13844], sought[13552], procedure[13452], attorneys[13425], court[13317], permission[13257], pregnant[11853], challenge[11488], bans[11382], unprecedented[11179], usa[11067], restrictive[10966], left[9490], obtain[9304], monday[6705], cox[3039], kate[2976], ruling[401], texas_supreme_court[118], emergency[54], ban[42], leave[10][59839]
[abortion,state,texas,woman][56], [abortion,cox,kate,texas][46], [abortion, cox, texas, woman][38]+4203 more tuples
Coalesced Tuple 2
[Donald_Trump[7903], supreme_court[7828], special_counsel[7506], Jack_Smith[6811], asks[5921], rule[5761], prosecuted[5373], election[5234], charges[5156], overturn[5124], quickly[4806], plotted[4719], asked[4562], results[3800], monday[2962], immunity[1118], decide[577], case[516], prosecution$^{423}$, asking$^{359}$, criminal$^{109}$, immune$^{77}$, presiden-tial$^{56}$, federal$^{53}$, claim$^{41}$, crimes$^{41}$, scotus$^{36}$, usa$^{33}$, request$^{30}$, interference$^{22}$, trial$^{17}$, court$^{10}$]$^{21746}$

[Donald_Trump,Jack_Smith,special_counsel,supreme_court]$^{73}$, [asks, Donald_Trump,special_counsel,supre-me_court]$^{55}$, [asks,Donald_Trump,Jack_Smith,supre-me_court]$^{46}$+1581 more tuples Coalesced Tuple 3

[faculty$^{1001}$, antisemitism$^{996}$, harvard$^{951}$, Claudin-e_Gay$^{935}$, president$^{778}$, university_president$^{715}$, remarks$^{416}$, rallies$^{383}$, members$^{382}$, criticized$^{372}$, aid$^{363}$, hundreds$^{205}$, university$^{185}$, calls$^{174}$, urging$^{141}$, congressional$^{108}$, hearing$^{108}$, comments$^{50}$, signed$^{42}$, lawmakers$^{40}$, amid$^{21}$, faces$^{21}$, testimony$^{11}$, donors$^{10}$, resign$^{10}$, school$^{10}$]$^{2107}$

Figure 3:
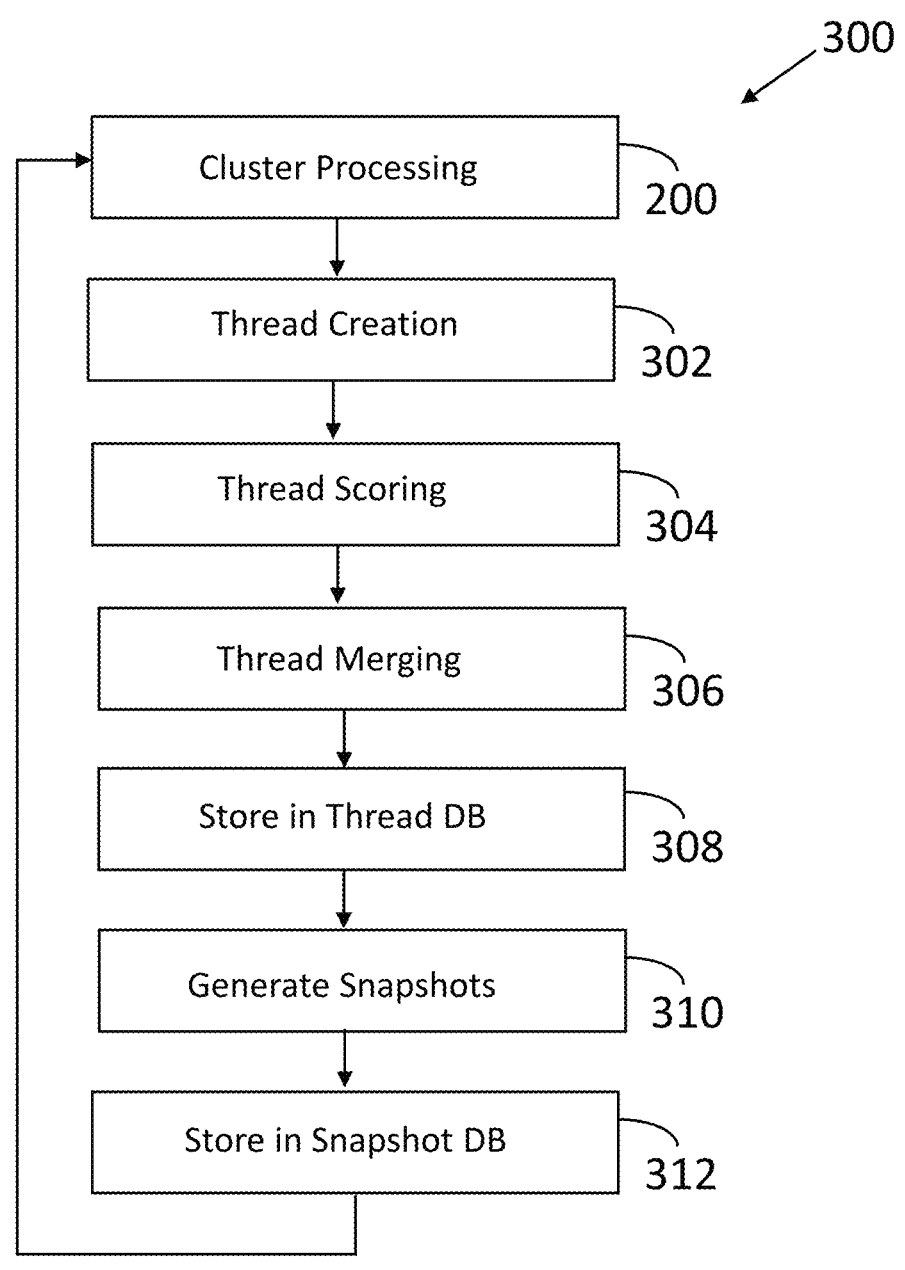
FIG. 3 illustrates thread processing performed in accordance with an embodiment of the invention.

[antisemitism,Claudine_Gay,harvard,president]$^{22}$, [calls, Claudine_Gay,harvard,president]$^{20}$, [Claudine_Gay, faculty,harvard,president]$^{17}$+188 more tuples+57 more coalesced tuples The cluster processing 200 of FIG. 2 is the first operation in a closed loop process 300 of FIG. 3. FIG. 3 illustrates operations performed by thread processor 146. The thread processor 146 is used to construct a thread database 148 and a snapshot database 150.

Each thread is a container for combining new content with cluster processing output. The new content is subject to cluster processing 200 performed by clustering module 144. Thread creation is then initiated 302. That is, new coalesced data is integrated with existing coalesced data. Conse-quently, threads keep track of content from multiple output rounds of cluster processing 200.

In the example of reporting of events in the news cycle, threads need to be dynamic and malleable. Events can split and multiple events can merge into a single event depending on the dynamics of the evolving event and how it is being reported.

Threads attempt to provide the flexibility to achieve this, along with the ability to self-correct as more data is collected and a more accurate statistical analysis can be performed.

The initial goal of threads is to create a forward-only path for each event. The events represented by coalesced tuples are either merged/evolved with existing threads to keep them current, or if no existing thread can be found, a new one is created.

When no active (non-archived) thread exists, a new thread is created from each input coalesced tuple and the following data is stored:

Coalesced tuple aggregate terms and their scores. E.g. [a$^{2090}$, b$^{2090}$, c$^{988}$, d$^{667}$, e$^{420}$]

Coalesced tuple aggregate score. E.g. 2090

Tuples used to form the coalesced tuple and their indi-vidual scores. E.g. [a, b, c, d]$^{45}$, [b, c, d, e]$^{32}$ Timestamp of thread creation When existing active (non-archived) threads exist, a com-parison to all existing threads is performed for each new input tuple. To evolve an existing active thread, criteria such as the following may be used:

Must have at least 1 common LVK

Must have at least 50% common terms

Must have at least 4 common terms

OR

Simply have at least 80% common terms (instant match).

If none of the criteria to evolve an existing active thread are met, it is assumed that there is no existing related thread, and a new active thread is created. Consider the following example:

[Donald_Trump$^{17437}$, supreme_court$^{17263}$, case$^{17114}$, hear$^{16914}$, hundreds$^{16591}$, charge$^{16460}$, capitol_riot$^{16021}$, including$^{15844}$, undo$^{15557}$, obstruction$^{11058}$, proceeding$^{10693}$, official$^{10438}$, defendants$^{10266}$, accused$^{10098}$, review$^{9971}$, justices$^{9924}$, appellate$^{9779}$, ruling$^{9678}$, revived$^{9656}$, wednesday$^{6804}$, charges$^{6395}$, upend$^{6177}$, stemming$^{5806}$, appeal$^{5310}$, trial$^{46}$, agreed$^{37}$, election$^{26}$, usa$^{21}$, president$^{13}$, common$^{12}$, mifepris-tone$^{12}$, charged$^{11}$]$^{70358}$

Match found using 1 LVK+4 common terms

[Donald_Trump$^{7903}$, supreme_court$^{7828}$, special_coun-sel$^{7506}$, Jack_Smith$^{6811}$, capitol_riot$^{6590}$, asks$^{5921}$, rule$^{5761}$, prosecuted$^{5373}$, election$^{5234}$, charges$^{5156}$, overturn$^{5124}$, quickly$^{4806}$, plotted$^{4719}$, asked$^{4562}$, results$^{3800}$, monday$^{2962}$, immunity$^{1118}$, decide$^{577}$, case$^{516}$, prosecution$^{423}$, asking$^{359}$, criminal$^{109}$, immune$^{77}$, presidential$^{56}$, federal$^{53}$, claim$^{41}$, crimes$^{41}$, scotus$^{36}$, usa$^{33}$, request$^{30}$, interference$^{22}$, trial$^{17}$, court$^{10}$]$^{21746}$ Therefore, the existing thread is evolved and the coalesced tuple linked to the thread is replaced.

If a thread has not evolved within a certain time (e.g., 72 hours), the thread is archived. Once a thread is archived, it can no longer be evolved and is excluded from all thread processing.

The state of the thread is retained after archiving.

As the coalesced tuples were generated from the source dataset, the tuples contained within the coalesced tuples (threads) can be used to query the source dataset for docu-ments. Content population and activation is performed every time the thread loop is completed.

Tuples/quads are updated after every thread evolution for each thread. These tuples are used to match content in the source dataset. A simple match is where all terms in a quad are found within a document. Consider the examples below:

[curb_your_enthusiasm,end,Larry_David,season]$^{13}$, [curb_your_enthusiasm,ending,Larry_David,season] $^{13}$, [curb_your_enthusiasm,hbo,Larry_David,season]$^{12}$ all 3 tuples are found in https://ohnotheydidnt.livejournal.com/127425109.html curb_your_enthusiasm ending with season 12 as Lar-ry_David says i bid you farewell—curb_your_enthusi-asm is ending with season 12 which premieres Febru-ary 4 on hbo and max the 10episode season will conclude with a series_finale on April 7 Larry_David says as curb comes to an end i_will now have the opportunity to finally shed this larry https://deadline.com/2023/12/curb-your-enthusiasm-offi-cially-ending-season-12-hbo-1235668008/ curb_your_enthusiasm officially ending with season 12 on hbo—this is pretty pretty pretty sad news curb_y-our_enthusiasm is officially coming to an end with season 12 on hbo every season creator and star Larry_David says that he ending the show but this https://www.dailystar.co.uk/showbiz/us-showbiz/break-ing-curb-your-enthusiasm-axed-31677141 curb_your_enthusiasm axed after 12 seasons as fans mourn end of an era-after 12 years on air hbo fanfa-vourite sitcom curb_your_enthusiasm has been axed with writer and comedian of the show Larry_David announcing he is ending the muchloved series Only 1 complete tuple is generally required for a match. Singles, doubles, and triples are by-products of the quad generation process. Content that is not a direct match with quads within the thread can be discovered via singles, doubles and triples that are:

Determined to be trending when the target frequency is greater than baseline frequency Where the "safe" singles, doubles, or triples all match terms in the aggregate terms of the thread (which is all the unique terms found in the coalesced tuples) [curb_your_enthusiasm$^{74}$, Larry_David$^{56}$, season$^{56}$, hbo$^{48}$, end$^{31}$, ending$^{31}$]$^{74}$ From these aggregate tuple terms, the following trending tuples were found:

Safe Trending Singles→[curb_your_enthusiasm]$_{112.9}$, [Larry_David]$_{83.6}$

Safe Trending Doubles→[curb_your_enthusiasm,Larry_David]$_{99.3}$, [curb_your_enthusiasm,hbo]$_{79.8}$, [hbo, Larry_David]$_{59.1}$ Safe Trending Triples→[curb_your_enthusiasm,hbo,Larry_David]$_{81.1}$ The baseline vs target values for these terms are:

| Term | Baseline Frequency | Target Frequency | Trending Score |
|---|---|---|---|
| curb_your_enthusiasm | 0.6 | 30 | 112.91 |
| Larry_David | 0.7 | 24 | 83.56 |
| hbo | 25.7 | 26 | 0 |

The "safe" component to these trending singles, doubles and triples is important. The safe definitions are:

$$-Singles = VLB$$

$$-Doubles = 1\ LB\ and\ no\ HB$$

$$-Triples = 1\ LB\ and\ no\ HB$$

VLB=Very Low Baseline and is defined as terms with a baseline below:

$$LVB\ threshold = Average\ frequency\ of\ baseline\ term +$$

$$(0.1*standard\ deviation\ of\ baseline\ terms)$$

LB=Low Baseline and is defined as terms with a baseline below:

$$LVB\ threshold = Average\ frequency\ of\ baseline\ term +$$

$$(0.5*standard\ deviation\ of\ baseline\ terms)$$

HB=High Baseline and is defined as terms with a baseline above:

$$HB\ threshold = Average\ frequency\ of\ baseline\ term +$$

$$(10*standard\ deviation\ of\ baseline\ terms)$$

For reference, the LVK threshold is defined for terms with a baseline below:

$$LVK\ threshold = Average\ frequency\ of\ baseline\ term +$$

$$(0.75*standard\ deviation\ of\ baseline\ terms)$$

The trending score for a single is calculated using the baseline frequency and target frequency for an individual term [n].

$$TrendingScore_N =$$

$$(TargetFreq_N - BaselineFreq_N)*\ln(1 - (TargetFreq_N / BaselineFreq_N))$$

For doubles and triples, the trending score of the tuple is the RMS (root-mean-square) of all the single's trending scores that it contains.

For example:

$$Trending\ Score\ Single\ [a] = TrendingScore_A$$

$$Trending\ Score\ Double\ [a, b] =$$

$$SQRT((TrendingScore_A{}^{\wedge}2 + TrendingScore_B{}^{\wedge}2)/2)$$

$$Trending\ Score\ Triple[a, b, c] =$$

$$SQRT((TrendingScore_A{}^{\wedge}2 + TrendingScore_B{}^{\wedge}2 + TrendingScore_C{}^{\wedge}2)/3$$

The next operation of FIG. 3 is thread scoring 304. Thread scoring is calculated by active content matching the thread. Two types of scores are calculated to evaluate the size of the pattern and its relevance in the near term.

Content volume

Content velocity

The content volume is simply the number of documents that match the coalesced tuple. For example, 100 documents=100 points. The content velocity is the sum of all the documents; however, they are plotted on a chart that positions them by age. Age=0 is given 100% of score. Age of 24 hours (or max score age) is given a 0% score.

Various content velocity curve filters may be used. A parabolic curve quickly ages, then slowly (25% age=50% score, 75% age=25% score). A linear filter ages linearly (50% age=50% score). A tan curve ages quickly, then slowly, then quickly again. A constant filter does not age (always 100% score)

The thread score at any given moment is the sum of the thread score curve up to the age limit for content. For example, a thread score could be defined as:

Parabolic score curve.

Max 48 hours.

When threads are output, they are sorted in order of thread score (highest to lowest). Consider the following example.

| Thread Id | Title | Aggregate Terms | Score (0-10) | Documents |
|---|---|---|---|---|
| 2382437 | ukraine | achieved, achieves, americans, annual, asked, . . . | 6.900016616 | 1189 |
| 2346502 | gaza_city | ally, ambush, attacks, battles, calls, ceasefire, . . . | 6.195291328 | 1907 |
| 2365087 | Andre_Braugher | actor, age, Andre_Braugher, brief, brooklyn_ninenine, . . . | 6.050925059 | 386 |
| 2383500 | Donald_Trump | according, adults, americans, apnorc, bidentrump, . . . | 5.959255938 | 810 |
| 2382436 | defense bill | $886, act, annual, authorization, authorizes, big, . . . | 5.853076967 | 103 |

-continued

| Thread Id | Title | Aggregate Terms | Score (0-10) | Docu- ments |
|---|---|---|---|---|
| 2385985 | curb_your_ enthusiasm | curb_your_enthusiasm, end, ending, final, hbo, . . . | 5.741705452 | 35 |
| 2385522 | six years | ago, alex, alive, batty, boy, british, france, missing, . . . | 5.472362973 | 36 |
| 2361598 | Rudy_Giuliani | attorney, begin, case, damages, decide, deciding, . . . | 5.237168296 | 195 |
| 2384832 | new_jersey | bull, commuters, delays, loose, morning, new_jersey, . . . | 5.134232245 | 28 |
| 2383605 | Taylor_Swift | 34th, birthday, Blake_Lively, new_york_city, night, . . . | 5.094833372 | 61 |
| 2384018 | guyana | guyana, leaders, longstanding, meet, region, . . . | 5.071720406 | 36 |

The next processing operation of FIG. 3 is thread merging 306. As the output can vary considerably from cycle to cycle, some additional threads may be created as the ebbs and flows of the news cycle (or equivalent data source) play out. Each thread is referenced by a unique numeric identifier. Threads are generally independent of each other; however, it is not uncommon for them to be associated in a parent/ child relationship. This is done when 2 or more threads are found to be sharing a significant amount of content. A child thread is defined by it having a parent thread associated with it. A parent thread is simply a thread which is not a child thread.

A test is performed on all active threads using the content that has been associated with them. If greater than 50% of a thread's content is contained within another thread, it will be merged with it (and will become a child thread of the parent it merged with).

This test is completed after threads have been populated with content.

Every thread cycle, existing parent/child relationships from previous cycles are ignored, and all are re-evaluated. It is common for the same parent/child relationships to be reestablished each cycle. Some variance between cycles does occur, however.

Threads that have been marked to be merged are arranged in order of size (from most content to least). The largest thread is chosen as the parent, and all other matching threads are chosen as children of the parent. The parent is the only thread shown in queries until the next round where all threads are re-evaluated, and the parent may change.

The merged threads are stored in a thread database 308. Snapshots of the thread database are then generated 310. The snapshots are then stored in a snapshot database 312.

Threads are always kept up-to-date based on the latest cluster processing outputs. Historical thread state is retained using snapshots. A snapshot is a copy of all active threads at the end of a thread cycle. Slices are used as a container to store the state of all active parent threads at that time. Snapshots are date/time stamped.

Slices are a container that can be used to specify a source dataset, or simply be used to store a snapshot of another slice. Slices based on a dataset are updated every thread cycle. Slices used for storing a snapshot are immutable once created. As only active parent threads are copied, a copy of all child thread IDs (including the parent thread ID) are also copied to retain a reference to the original threads that can link snapshot threads to threads in a neighboring snapshot.

A snapshot may contain the following components:
Thread title
Thread scores
Active content
Snapshot time
Original thread creation time
List of all parent/child thread IDs The client module 122 may be used to query the snapshot DB 150. Snapshot querying is often used to obtain the latest complete output of thread processing, content, and scoring. Threads contained in the output of a snapshot query are output in order of highest to lowest thread score. The thread score indicates both the strength of the pattern and relevance of the thread calculated from recency and volume of content when the snapshot was taken. The thread score may be normalized to a range between 0 and 10. Consider the following example.

| SSThread ID | Thread Title | Terms | Score (0-10) |
|---|---|---|---|
| 2388836 | ukraine | 1st, achieved, achieves, americans, annual, asked, . . . | 7.03 |
| 2388843 | gaza_city | ally, ambush, battles, calls, ceasefire, crushes, . . . | 6.36 |
| 2388854 | Andre_Braugher | actor, age, Andre_Braugher, brief, brooklyn_nine nine, . . . | 6.09 |
| 2388861 | defense bill | $886, act, annual, authorization, authorizes, big, . . . | 6.03 |
| 2388865 | Donald_Trump | according, adults, americans, apnorc, bidentrump, . . . | 5.97 |
| 2388871 | curb_your_ enthusiasm | curb_your_enthusiasm, end, ending, final, hbo, . . . | 5.92 |
| 2388875 | six years | ago, alex, alive, batty, boy, british, france, missing, . . . | 5.65 |
| 2388879 | Draymond_Green | center, Draymond_Green, face, forward, . . . | 5.65 |
| 2388883 | new_jersey | bull, commuters, delays, loose, morning, new_jersey, . . . | 5.32 |
| 2388887 | Sidney_Powell | apology, case, chesebro, deals, decide, election, . . . | 5.28 |

Figure 4:
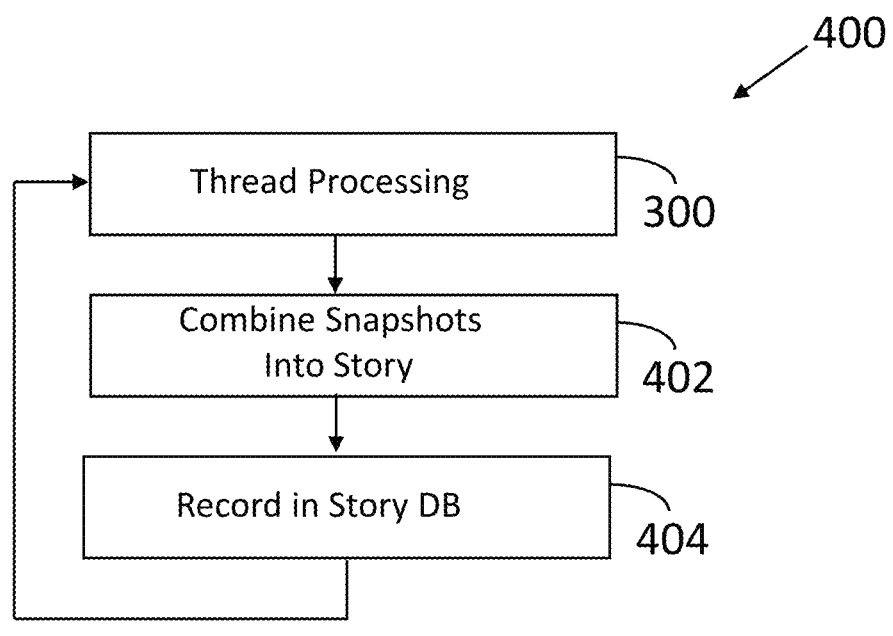
FIG. 4 illustrates story processing performed in accordance with an embodiment of the invention.

Snapshots can be queried by:
Specific Snapshot ID (Snapshot Slice ID)
Snapshot closest to timestamp
List of available snapshots
Results returned for specific snapshot queries:
Snapshot ID
List of snapshot threads
   Snapshot Thread ID
   Title
   Score
   List of documents
      URL
      Title
      Body
Results returned for list of available snapshots:
List of snapshots
   Snapshot Slice ID
   Snapshot Thread Count
   Timestamp Returning to FIG. 1, a story processor 152 combines snapshots in the snapshot database 150 to form a story that is stored in a story database 154. FIG. 4 illustrates story processing 400 performed by the story processor 152. The thread processing 300 of FIG. 3 is a first operation of a closed loop process in which snapshots are combined into a story 402 and then the story in recorded in the story database 404.

Continuities connect all thread snapshots into a continuous story from start to finish. As original/source threads are forward-only, previous states are not accessible. Snapshots provide a solution to access previous states. Connecting thread state via snapshots is not always a straightforward calculation, as one thread is often made up of a parent and child threads, where the parent thread can easily change to a child thread (and vice-versa) between cycles.

Stories bind conversations between snapshots/threads, which allows for a much grander perspective over time. Stories also have the benefit of not being a real-time/one-off calculation. Stories can benefit from hindsight, and fix anomalies that occurred in the past automatically, using data that occurred in the future with respect to the original thread.

The story processor 152 detects "continuities" by loading all snapshots and looking for the next thread in the sequence from one snapshot to the next. When continuities have been calculated in their entirety, they are saved as stories (continuities are incomplete or non-final stories).

Figure 5:
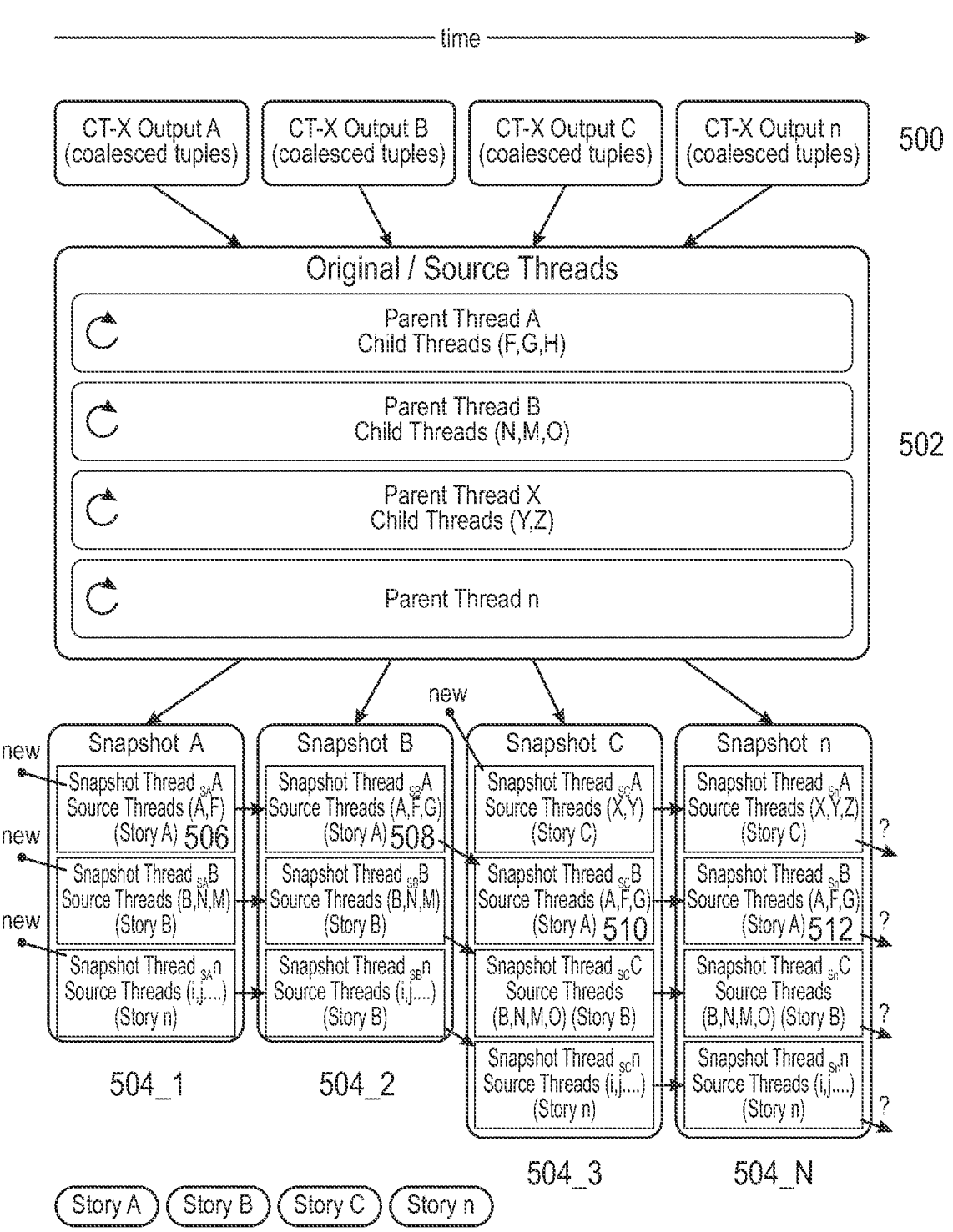
FIG. 5 illustrates a hierarchical relationship between coalesced tuples, threads, snapshots, and stories associated with the invention.

FIG. 5 illustrates different coalesced tuples 500 forming a set of parent threads 502, which then form different snapshots 504_1 through 504_N. As shown in FIG. 5, when snapshots are generated, the original thread IDs (Source Thread IDs) are recorded; this includes the parent thread ID and the child thread IDs associated with the parent. FIG. 5 also shows how snapshots 506, 508, 510 and 512 are combined into a single story.

The snapshot copy retains all the original parent/child thread IDs (Source Thread IDs) at that moment, so even if the parent and child get swapped in a subsequent snapshot, the relationship can be re-formed.

By keeping track of the constantly evolving parent/child thread IDs, the complex relationship between similar threads can be distilled down to a single story by evaluating Source Thread IDs.

Figure 6:
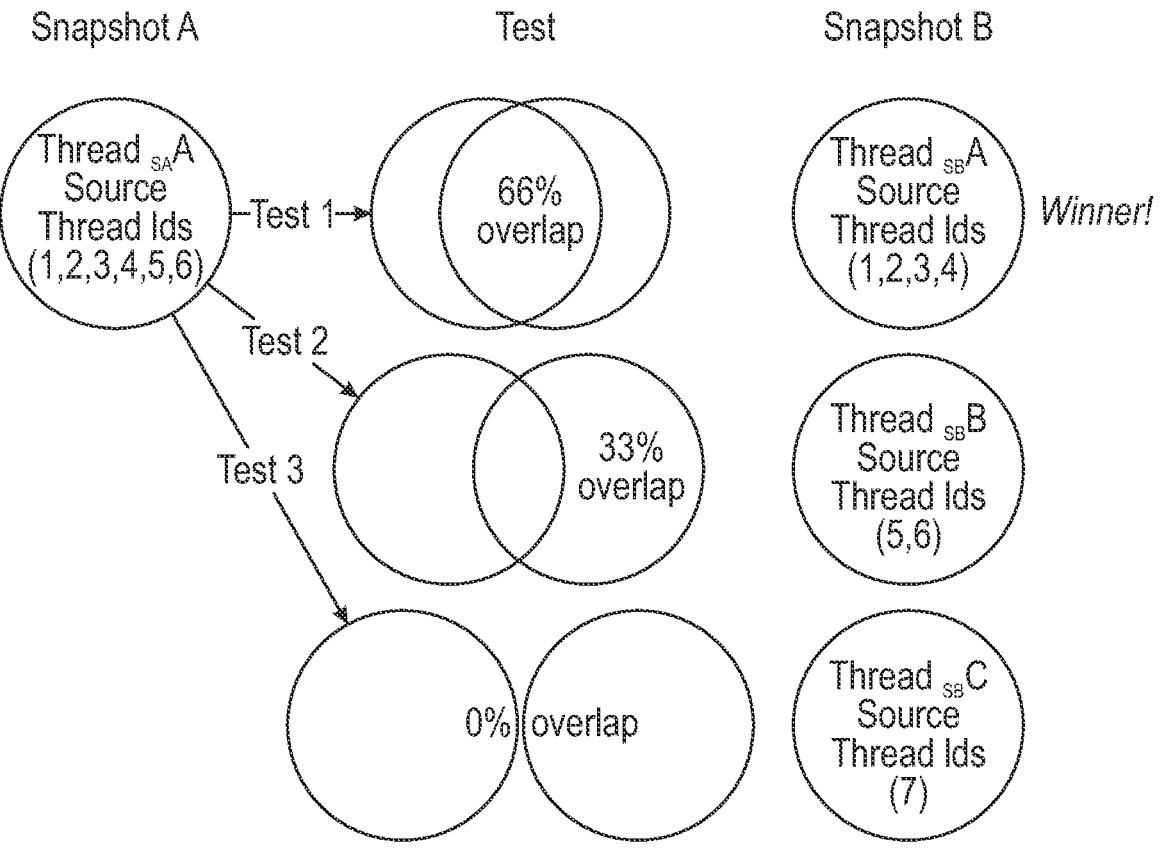
FIG. 6 illustrates snapshot merging performed in accordance with an embodiment of the invention.

The continuity is calculated from snapshot to snapshot by trying to match the best matching thread moving forward. This is done by selecting the thread in the subsequent snapshot that matches the most Source Thread IDs. This is shown conceptually in FIG. 6.

Consider a list of threads in Snapshot A. Each thread is compared against all threads in the next snapshot (Snapshot B). The thread that contains the highest percentage of overlapping Source Thread IDs is chosen as the winner, which is the top row of FIG. 6. If no match can be made from a thread in Snapshot A to Snapshot B, the continuity ends. If a thread in Snapshot B was not matched with a thread from Snapshot A, a continuity is created.

More complex parent/child thread relationships can exist in source threads. An example of this is below, where 3 parent threads each have many child threads that overlap over the 3 snapshots. The result is 2 distinct continuities.

Snapshot $A = [\text{Thread}_{SA}101{:}1, 5, 6, 7, 8]$, $[\text{Thread}_{SA}102{:}2, 9, 10, 11], [\text{Thread}_{SA}103{:}12, 13, 14, 15]$ Snapshot $B = [\text{Thread}_{SB}201{:}1, 2, 5, 6, 7, 8]$, $[\text{Thread}_{SB}202{:}9, 10, 11], [\text{Thread}_{SB}203{:}12, 13, 14, 15]$ Snapshot $C = [\text{Thread}_{SC}301{:}1, 2, 5, 6, 7, 8, 9, 10, 11]$, $[\text{Thread}_{SC}303{:}12, 13, 14, 15]$

16

Continuity compression merges multiple continuities into a single continuity under the following circumstances:

When a continuity's pool of source threads (list of all source threads from all snapshot threads in the continuity) are wholly contained within another story When a story is partially contained within another story; exact overlap percentage requirements can vary.

Two merge parameters can be set:

1. Minimum overlap merge percentage (default=100%)

(A intersect B)/Min (A, B)

Common IDs between A and B, Minimum #of IDs contained within A and B.

2. Minimum aggregate overlap merge percentage (default=50%)

(A intersect B)/(A union B)

Common IDs between A and B; Total distinct #of IDs contained within A and B.

Where possible, existing story IDs are used to create a persistent reference point for stories. When story IDs are archived, the new story ID is referenced to provide a redirect path (where 2 or more stories became a single story). The first thread in the continuity is used to extract a story ID. If that thread is not linked to an existing story ID, a new story ID is created. All snapshot threads within that continuity branch are updated with the same story ID taken from the first thread or from the newly created story. This is depicted in FIG. 9.

Stories are defined by the snapshot threads associated with them. Therefore, calculated attributes may change after each story loop if the snapshot threads associated with it were altered.

In one embodiment, basic story attributes include:

Story ID

Associated snapshot thread IDs

Calculated story attributes derived from the associated snapshot thread IDs may include:

Aggregate document scores

Including relevance calculation for each document based on the number of thread snapshots in the document associated with the story.

Example: Document list returned for associated snapshot thread IDs for story.

| Snapshot Thread ID | Document ID |
|---|---|
| 1000 | 15FB5B74-335A-47FF-896D-E09B1A3222FE |
| 1000 | 33819D7F-AE8D-4806-912F-7BD80F3EF79A |
| 1000 | 98946136-F234-4A10-97AF-1F87BC2E134D |
| 1001 | 15FB5B74-335A-47FF-896D-E09B1A3222FE |
| 1001 | 33819D7F-AE8D-4806-912F-7BD80F3EF79A |
| 1001 | 98946136-F234-4A10-97AF-1F87BC2E134D |
| 1001 | B140C5C9-8AE8-4D09-B332-7C5175DF3C7A |
| 1002 | 15FB5B74-335A-47FF-896D-E09B1A3222FE |
| 1002 | 98946136-F234-4A10-97AF-1F87BC2E134D |
| 1002 | B140C5C9-8AE8-4D09-B332-7C5175DF3C7A |

Aggregate Story Document Output:

| Document ID | Score |
|---|---|
| 15FB5B74-335A-47FF-896D-E09B1A3222FE | 3 |
| 33819D7F-AE8D-4806-912F-7BD80F3EF79A | 2 |
| 98946136-F234-4A10-97AF-1F87BC2E134D | 3 |
| B140C5C9-8AE8-4D09-B332-7C5175DF3C7A | 2 |

Aggregate coalesced tuple term scores

The aggregate of all the aggregate coalesced tuples contained within the snapshot threads.

Example: Aggregate coalesced tuple terms for Thread Snapshots A, B are summed to produce $_{AGG}$Score and $_{AGG}$Term.

| $_{SA}$Score | $_{SA}$Term | $_{SB}$Score | $_{SB}$Term | $_{AGG}$Score | $_{AGG}$Term |
|---|---|---|---|---|---|
| 524 | iceland | 1020 | iceland | 1544 | iceland |
| 470 | volcano | 990 | volcano | 1460 | volcano |
| 186 | erupts | 334 | erupts | 520 | erupts |
| 171 | eruption | 372 | eruption | 543 | eruption |
| 165 | reykjanes | 334 | reykjanes | 499 | reykjanes |
| 151 | peninsula | 280 | peninsula | 431 | peninsula |
| 111 | lava | 134 | lava | 245 | lava |
| 98 | evacuated | 260 | evacuated | 358 | evacuated |
| 87 | grindavik | 132 | grindavik | 219 | grindavik |
| 86 | weeks | 359 | weeks | 445 | weeks |
| 77 | town | 203 | town | 280 | town |
| 29 | spewing | 41 | spewing | 70 | spewing |
| 26 | flights | 37 | flights | 63 | flights |
| 13 | activity | | | 13 | activity |
| 13 | sky | | | 13 | sky |
| 13 | southwestern | | | 13 | southwestern |
| | | 141 | monday | 141 | monday |
| | | 141 | thousands | 141 | thousands |
| | | 74 | night | 74 | night |
| | | 36 | affect | 36 | affect |
| | | 32 | erupted | 32 | erupted |

Number of documents by snapshot timestamp

The number of documents in the story over time
{[$_{SA}$Timestamp, $_{SA}$.Thread.Documents.Count( )], [$_{Sn}$Timestamp, $_{Sn}$.Thread.Documents.Count( )] . . . }

Thread scores by snapshot timestamp

The score of the story over time
{[$_{SA}$Timestamp, $_{SA}$.Thread.Score], [$_{Sn}$Timestamp, $_{Sn}$.Thread.Score] . . . }

Active—active in most recent snapshot (an active story) Story$_n$.Active=Story$_n$.ThreadIds.Contains(Snapshot$_{Latest}$. ThreadIds)

In one embodiment, a single story contains a packet of the following data:

Unique identifier (Story ID)

Coalesced Tuples (in aggregate form)

Associated Documents

Score (0-10)

Active Flag

Story output combines the documents that match the story, along with the identity of the story defined by the coalesced tuples found in the associated thread snapshots. A story can represent an active (present) or historical view of the source dataset. The active stories are identified by the "active" attribute. The most recent score and number of documents for a given story is found by looking at the Scores and NumDocuments attributes and finding the most recent Timestamp and the score/value associated with it.

| StoryID | 243556 |
|---|---|
| AggregateCoalescedTupleTermScores | [[volcano, 2090851], [iceland, 2090280], [erupts, 1999341], [reykjanes, 1960981], [peninsula, 1931228], [weeks, 1885293], [sky, 1780927], [volcanic_eruption, 1760769], [orange, 1746350], [evacuated, 1743913], [monday, 1731789], [alert, 1721882], [high, 1719710], [thousands, 1714571], [night, 1708499], [turning, 1682191], [prompting, 1615217], [started, 1586429], [civil_defense, 1446110], [town, 990795], [country, 440009], [grindavik, 104255], [eruption, 67571], [activity, 32084], [lava, 12861], [seismic, 12520], [meteorological, 4872], [office, 4830], [erupted, 4552], [spewing, 4366], [earthquakes, 3097], [southwest, 2070], [intense, 1590], [flights, 924], [scientists, 726], [nearby, 465], [following, 426], [southwestern, 408], [affect, 234], [near, 186], [rock, 144], [icelandic, 108], [magma, 72], [earthquake, 72]] |
| AggregateDocumentScores | Dictionary of <Document, Score>, where score is a number (see Document object) e.g. {[15FB5B74-335A-47FF-896D-E09B1A3222FE, 3], . . . } |
| NumDocuments | Dictionary of <Timestamp, Count> e.g. {[202312190330, 74], 202312190345, 81], . . . } |
| Scores | Dictionary of <Timestamp, Score> e.g. {[202312190330, 6.3], 202312190345, 6.5], . . . } |
| CreatedTimestamp | 202312190330 |
| LastTimestamp | 202312190345 |
| Active | True |

A document object contained within the <Document, Score> dictionary has the following fields:

| DocumentID | 2d214187-62b3-4f3e-93c0-5a6a0ef2b9f4 |
|---|---|
| URL | https://www.latimes.com/world-nation/story/2023-12-18/iceland-volcano-erupts-weeks-after-thousands-were-evacuated-from-a-town-on-reykjanes-peninsula |
| Title | Iceland volcano erupts weeks after thousands evacuated |
| Body | A volcanic eruption began Monday night on Iceland's Reykjanes Peninsula, turning the sky orange and prompting the country's civil defense to be on high alert |
| Timestamp | 202312190132 |

Thus, the story DB 154 has stories that are the culmination of the disclosed production line. The disaggregated documents found in the source dataset are automatically organized into a digestible collection of distinct stories that are continually updated as the source dataset is updated. These distinct stories are made up of tuples that merged into groups (coalesced tuples) due to one or more of their components trending over the baseline of the dataset. As these components were trending over the target range of the dataset compared to the baseline, they are considered statistically significant and are used to merge tuples together. This allows a safe meshing of common and uncommon terms into a single story, even though stories will often have common terms.

As the tuples were derived from the source dataset, the tuples within each coalesced tuple will match with the documents that they were originally derived from. After the source dataset has been processed, what is output is an automatically organized dataset of stories, which in turn reference documents from the original source dataset. When compared to the original dataset, each story is far easier to digest by machine. Documents that do not follow a pattern identified by a story can be ignored, and as each document is scored for relevance, quality filters can be used to further optimize ingestion of documents without having to ingest the entire story.

Figure 7:
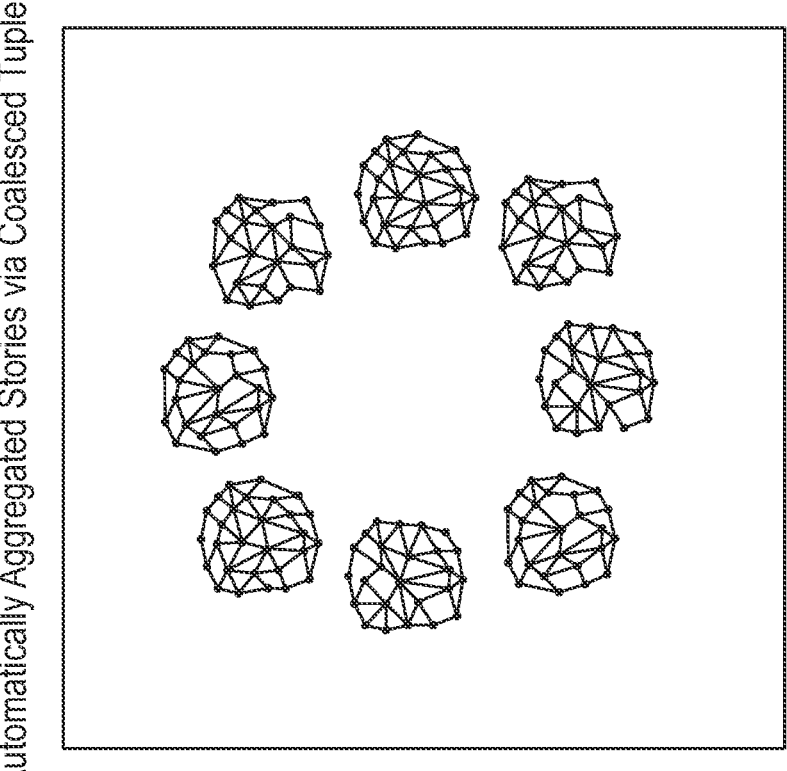
FIG. 7 conceptually illustrates the disclosed invention's organization of numerous disaggregated documents into aggregated stories of coalesced tuples.
Figure 7:
Figure 7:
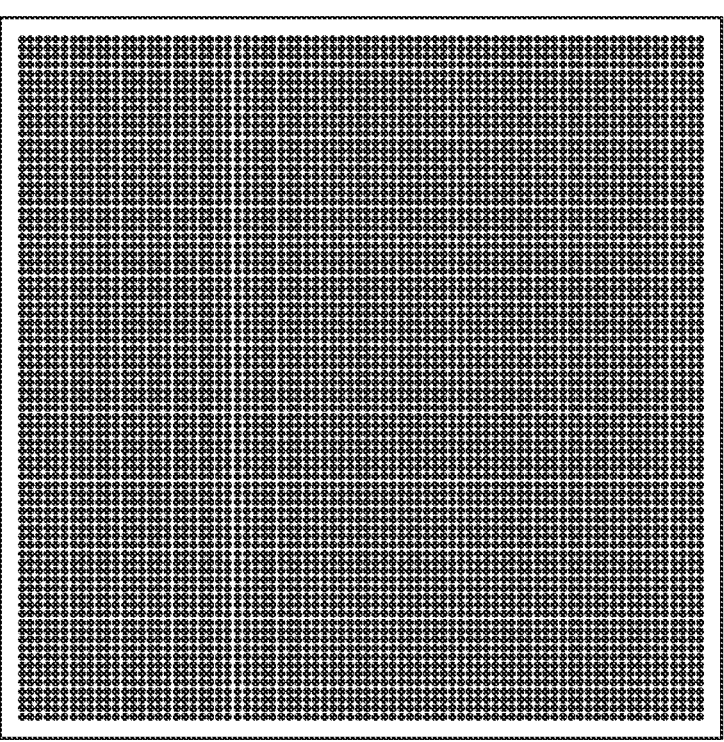

FIG. 7 conceptually depicts the processing disclosed herein. On the left are disaggregated documents of the unstructured DB 142. This collection of documents is large and unorganized. On the right side of the figure is a conceptual depiction of the story DB 154, where each set of linked dots represents a story. The story is constructed from individual documents, each represented by a dot. Thus, FIG. 7 shows how the disclosed invention effectively filters an original document set by removing non-trending information. The figure also shows how the original document set is organized into related information.

Figure 8:
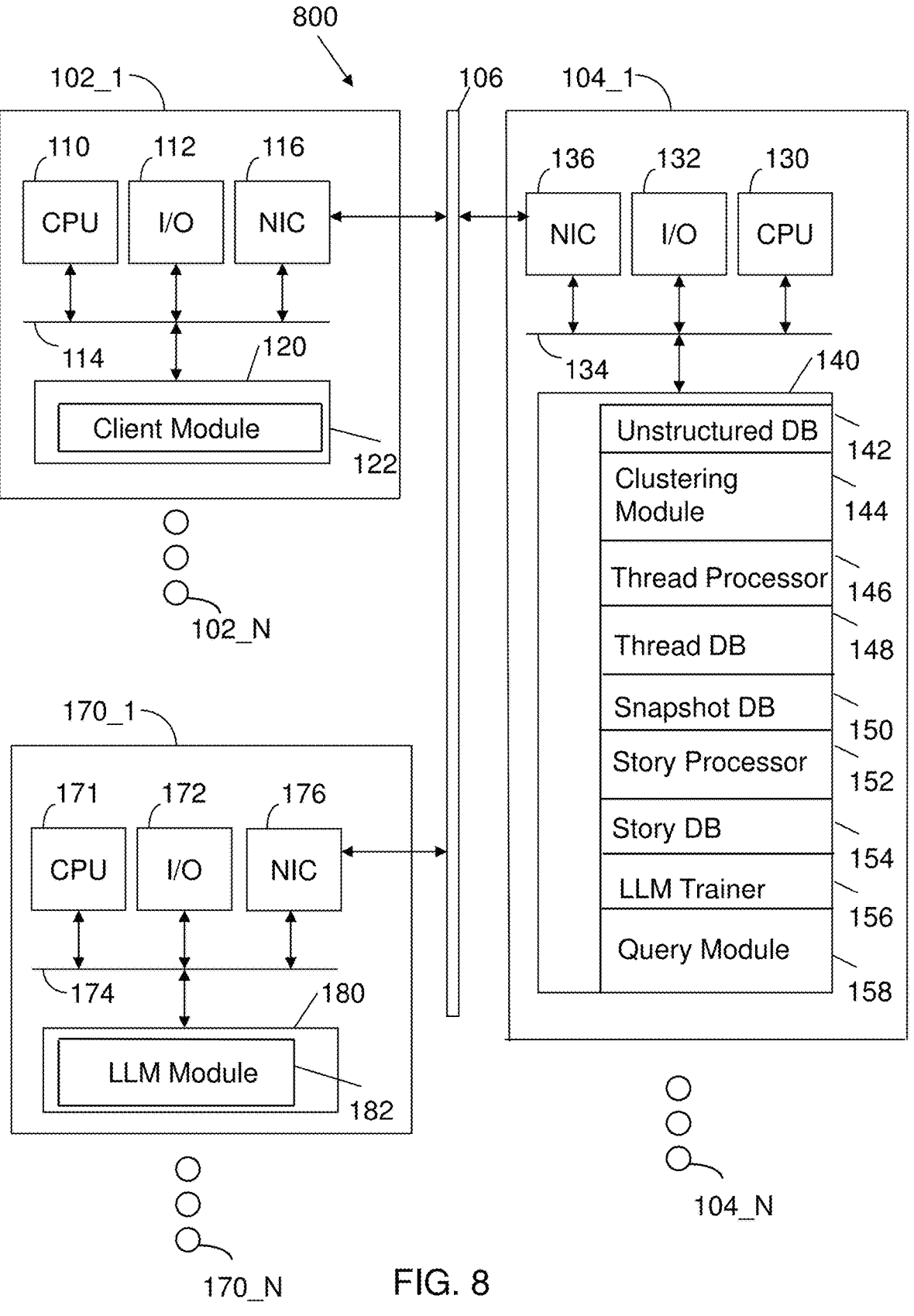
FIG. 8 illustrates the disclosed system integrated with Large Language Model (LLM) machines in accordance with an embodiment of the invention.

FIG. 8 illustrates a system 800 configured in accordance with an embodiment of the invention. The system 800 generally corresponds to system 100 of FIG. 1, but the memory is augmented to include an LLM trainer 156 and a query processing module 158. Also, content machines 150_1 through 150_N are not depicted as being connected to network 106. Rather, LLM machines 170_1 through 170_N are connected to network 106. LLM machine 170_1 and each of the other LLM machines are nodes in an LLM network. LLM machine 170_1 includes a processor 171, input/output devices 172, a bus 174, and a network interface circuit 176. A memory 180 is connected to bus 174. The memory 180 stores an LLM module 182 with instructions executed by processor 171 to support training of an LLM and subsequent use of a trained LLM to prepare responses to queries submitted by the query module 158.

The LLM trainer 156 accesses the story DB 154 to collect pre-organized data to train an LLM. Typically, when it comes to processing news and current event data beyond the temporal limits of an LLM's knowledge base, the LLM's only option is to utilize what is effectively the disaggregated data on the left side of FIG. 7. With the disclosed technology the LLM trainer 156 supplies the LLM model with automatically aggregated stories of coalesced tuples. Thus, it becomes possible to train the mode on story data, and the training process is far more efficient since there is less data and the submitted data is already thematically organized.

The query module 158 supports queries applied to the trained LLM model and the story DB 154. Observe that story results are prepared in advance, so queries are quick and efficient. The disclosed system has already identified the patterns (stories) most likely to yield results within the source dataset.

For machines: Source dataset is broken down into digestible chunks, where ability to ingest can be scaled with controlled loss of fidelity, where each story's resources can be governed by filtering by relevance.

For users: There is an immediate breakdown of important patterns in the source data set. Consequently, less time is required to sort through results. Stacked levels of relevance calculations return precise results first.

Even though the source dataset has been broken down and grouped into discrete objects (stories) orders of magnitude fewer in number, it retains the statistically significant documents within each story. Documents within each story can be further filtered by setting an intelligent cap via a relevance score.

In one embodiment, the query module supplies two types of query results.

Non-interactive queries do not alter the source story in any way. Any additional filtering is the responsibility of the target system. Non-interactive queries can be automated to ensure the target system is as up to date as required. An example of a non-interactive query would be LLM fine-tuning, where the story DB 154 is used as supplemental training data.

Interactive queries filter the results to immediately make them easier to ingest in the target system. Interactive queries are usually one-off requests. This is especially relevant for RAG (Retrieval Augmented Generation) with an LLM, although just as pertinent to any other system that requires the most targeted data retrieval with a hard limit to returned results (documents).

As stories are updated in an automatic, ongoing fashion, efficient and automatic machine to machine querying and ingesting of stories provides accurate near real-time results. Full Story query types are used to copy the entire story DB 154. A full query type is intended to copy the entire story database into another system.

Incremental story query types will only return stories that have changed since the UTC timestamp provided. Usually, incremental queries are used after a complete full query has been performed at least once.

Before being ingested by an LLM or other systems, a further limiting of each story's documents can be achieved by filtering by either x % or x number of documents based on the relevance score provided for each document. The highly relevant documents contain more of the tuples used to represent the story than the documents with a lower relevance score.

Story relevance is calculated using the aggregate term scores, which is based on the coalesced tuples contained within all thread snapshots of the story.

$$\text{Story}_n \text{ relevance} = [\text{sum of matching story}_n \text{ term scores}]/[\text{sum of all story}_n \text{ term scores}]$$

The formula to implement the document limit specified is as follows:

$$\text{Document limit for story}_n = \text{Floor}[([\text{story}_n \text{ relevance}]/[\text{sum of relevance score for all stories}])*[\text{document limit}]]$$

| Story | Terms | Sum (Terms) | Sum (Matching) | Relevance | Documents |
|-------|-------|-------------|----------------|-----------|-----------|
| A | [Taylor_Swift, 80], [NFL, 30], [a, 20], [b, 10] | 140 | 110 | 0.785714286 | 80 |

-continued

| Story | Terms | Sum (Terms) | Sum (Matching) | Relevance | Documents |
|---|---|---|---|---|---|
| B | [a, 200], [b, 100], [Taylor_Swift, 10], [NFL, 5] | 315 | 15 | 0.047619048 | 4 |
| C | [a, 50], [Taylor_Swift, 10], [c, 5], [d, 4] | 69 | 10 | 0.144927536 | 14 |
| | | | | 0.97826087 | 100 (limit) |

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:

receiving at a server a baseline dataset from a network connected content source machine, where the baseline dataset is divisible by temporal or logical criteria;

receiving at the server a target dataset from the network connected content source machine, where the target dataset represents a small fraction of the baseline dataset, the target dataset being segmented by the temporal or logical criteria;

identifying, without user direction, numbers of documents containing individual terms within the baseline dataset to form baseline singles;

identifying, without user direction, numbers of documents containing common combinations of individual terms within the target dataset to form target tuples, where each common combination of individual terms provides context for each term in the common combination; and coalescing, without user direction, combinations of the target tuples based upon baseline singles criteria to form a first coalesced dataset representing content in the target dataset, where the content includes thematic conceptual clusters in the target dataset.

2. The computer implemented method of claim 1 wherein a temporal criterion is a 24-hour period.

3. The computer implemented method of claim 1 wherein a logical criterion is segments within a publication.

4. The computer implemented method of claim 1 further comprising pre-processing the baseline dataset and the target dataset by removing punctuation, stemming terms, and connecting terms that belong together.

5. The computer implemented method of claim 1 wherein coalescing includes ranking target tuples by numbers of instances and then filtering and thereby skimming target tuples to a fraction of all target tuples.

6. The computer implemented method of claim 1 wherein the number of tuples subject to further processing is less than 2% of the number of tuples formed.

7. The computer implemented method of claim 6 wherein the number of tuples coalesced is less than 2% of the number of tuples subject to further processing.

8. The computer implemented method of claim 7 wherein the number of tuples after final filtering is less than 2% of the number of tuples coalesced.

* * * * *